United States Patent [19]

Katayama et al.

[11] Patent Number: 4,916,008

[45] Date of Patent: Apr. 10, 1990

[54] PLASTIC MOLDING

[75] Inventors: Kenji Katayama; Masayoshi Kozuka, both of Anjyo, Japan

[73] Assignee: Inoue MTP Kabushiki Kaisha, Nagoya, Japan

[21] Appl. No.: 269,828

[22] Filed: Nov. 10, 1988

[30] Foreign Application Priority Data

May 26, 1988 [JP] Japan ............................ 63-69724[U]

[51] Int. Cl.⁴ .......................... B32B 3/10; B32B 15/08
[52] U.S. Cl. ...................................... 428/205; 428/31; 428/209; 428/421; 428/422; 428/463
[58] Field of Search ................. 428/209, 31, 457, 422, 428/421, 463, 205; 296/93

[56] References Cited

U.S. PATENT DOCUMENTS

| | | | |
|---|---|---|---|
| 4,277,526 | 2/1981 | Jackson | 428/31 |
| 4,349,592 | 9/1982 | Nussbaum | 428/31 |
| 4,368,225 | 1/1983 | Nussbaum | 428/31 |
| 4,441,755 | 4/1984 | Endo et al. | 296/93 |

Primary Examiner—Thomas J. Herbert
Attorney, Agent, or Firm—Armstrong, Nikaido, Marmelstein, Kubovcik & Murray

[57] ABSTRACT

A plastic molding comprising a plastic substrate and a decorative film or sheet which has an outermost layer of fluororesins coated at its one surface with a vaporized metal layer, an intermediate layer of ethylene-acrylic acid copolymeric resins laminated on the metal layer, and an innermost layer of backing resins which is adhered to the intermediate layer by an adhesive layer. The decorative film or sheet is molten to be adhered onto the plastic substrate, so that the backing resin layer comes into contact with the plastic base.

6 Claims, 1 Drawing Sheet

PLASTIC MOLDING

BACKGROUND OF THE INVENTION

1. Field of the Invention

The present invention relates to a plastic molding which is applied to peripheries of a window panel or side faces of a body of an automobile for the purpose of decoration or protection of the vehicle body, and more precisely it relates to a plastic molding which presents a metallic color, such as stainless steel.

2. Description of Related Art

As a recent trend, front and rear window panels of an automobile are directly adhered to flanges of a body panel which define window openings. In this direct adhesion, a decorative plastic molding is provided to conceal a gap between the vehicle body panel and the window panel.

There are various known plastic moldings having metallic colors. In particular, a plastic molding presenting a metallic color of stainless steel is popularly used. Such a stainless steel color can be realized by applying a decorative film which is made of a plastic film metallized with a metal, such as chrome, onto the plastic substrate of the window molding, as disclosed for example in Japanese Examined Utility Model Publication (Kokoku) No. 61-2037.

The plastic molding disclosed in Kokoku No. 61-2037 has a decorative film which has improved weatherproofing and prevents wrinkling of the plastic molding which would otherwise occur when the plastic molding is bent along the profile of the window panel(s). The decorative film has an innermost layer of a vinyl chloride-vinyl acetate copolymer, an intermediate layer of ion cross-linking copolymer, and an outermost layer of fluoroplastics which is metallized at its internal surface with a chrome by vacuum evaporation on which the intermediate layer is superimposed. The decorative film is incorporated in a plastic molding of polyvinyl chloride, so that the outermost fluoroplastic layer is exposed.

The outermost fluoroplastic layer exhibits less aging and wrinkling when bent. However, the plastic molding mentioned above has the following drawback. Namely, usually, when the plastic molding is applied to the periphery of the window panel, it is subject to a cold bending. That is, the molding is successively bent and fixed along the profile of the gap between the vehicle body panel and the window panel at a normal temperature. However, when the molding after is applied to the vehicle, and experiences a change of ambient conditions, such as change of temperature due to direct sunlight, the inner side of the molding tends to wrinkle at the corner portions of window panels having large curvature. It has been experimentally confirmed by the inventors that the wrinkling was caused mainly by the separation of the metal layer from the ion cross-linking copolymer layer.

The inventors have conceived that the causes of the above-mentioned separation are that an unsaturated carboxylic acid of a base polymer of ion cross-linking copolymer is partly or entirely neutralized with a metal ion, resulting in a decreased adhesion of carboxylic acid to metal and that ion cross-linking can be easily dissociated by heat.

SUMMARY OF THE INVENTION

The primary object of the present invention is therefore to provide an improved plastic molding comprising a plastic substrate and a decorative film or sheet which has an outermost layer of fluoroplastics coated or metallized at its one surface with a metal, an intermediate layer of ethylene-acrylic acid copolymers laminated on the metal layer, and an innermost backing layer which is adhered to the intermediate layer by an adhesive layer, said decorative film or sheet being molten to be adhered onto the plastic substrate, so that the backing layer comes into contact with the plastic substrate.

An intermediate layer of ionomer plastics can be provided between the intermediate layer of ethylene-acrylic acid copolymers and the backing layer, so that the latter is adhered onto the ionomer plastic layer by the adhesive layer.

With this arrangement, since ethylene-acrylic acid copolymers laminated over the metal surface contain a carboxyl group in a molecular structure thereof and also said carboxyl group is not being ionically neutralized with a metal ion, the copolymers exhibit very excellent adhesion properties to the metal. Further, since the molecular structure of said copolymers contains a carboxyl group as a side chain or the like in the copolymers, and said carboxyl group constitutes a hydrogen bond, said copolymers have an excellent hot-tack property due to high viscosity at melting and therefore there is an advantage that they are firmly heat-bonded to the metal surface and the like.

Furthermore, since said ethylene-acrylic acid copolymers have no substantial moisture(water)-absorption property, they have an advantage that an adverse effect of water to the metal bonded to the layer of said copolymers is avoided.

A plastic molding in which the metal surface is coated with the layer of said copolymers can provide therefore a good appearance to a vehicle.

BRIEF DESCRIPTION OF THE DRAWINGS

The invention will be described below in detail with reference to the accompanying drawings, in which.

DESCRIPTION OF EMBODIMENT

Figure 1:
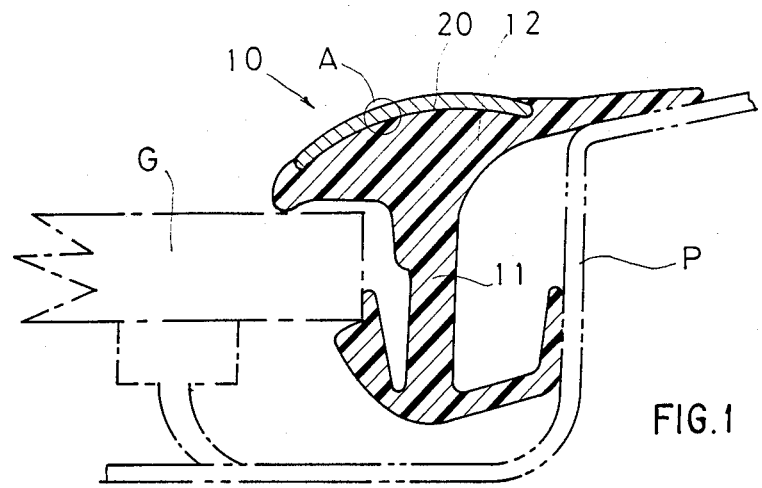
FIG. 1 is a sectional view of an embodiment of a plastic molding according to the present invention.
Figure 2:
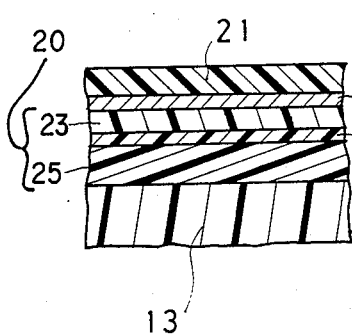
FIG. 2 is an enlarged view of a portion A in FIG. 1.

A plastic molding 10 for a window of a vehicle according to an embodiment of the present invention shown in FIGS. 1 and 2 has an external portion 12 and a leg portion 11 which is integral with the external portion 12 and which is adapted to be inserted and secured in a gap between a window panel G and a vehicle body (body panel) P. The molding 10 is attached to the vehicle body, so that the external portion 12 lies on the body panel on one hand and on the peripheral edge of the window panel G on the other hand. The external portion 12 has a decorative film or sheet 20 applied thereto to show a desired metallic color.

As can be seen from FIG. 2, which is an enlarged section of portion A of FIG. 1, the decorative film or sheet 20 has an outermost layer 21 of fluoroplastics, a metal layer 22, a first intermediate layer of ethylene-acrylic acid copolymers 23, an adhesive layer 24 and a backing layer 25. The backing layer 25 is molten to be secured onto the substrate 13 of the external portion 12 which forms the molding body.

Figure 3:
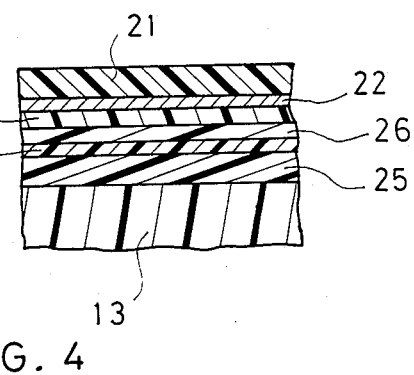
FIG. 3 is an enlarged view of a decorative portion according to another embodiment of the present invention; and, FIG. 4 is a schematic diagram of a hydrogen bond of ethylene-acrylic acid copolymer.

It is also possible to provide a second intermediate layer of ionomer plastic layer 26 between the ethylene-acrylic acid copolymers layer (first intermediate layer) 23 and the backing layer 25, as shown in FIG. 3.

As the outermost fluoroplastic layer 21 can be used a transparent film made from various kinds of fluoroplastics, such as polytetrafluoroethylene, tetrafluoro-ethylene-perfluoroalkylvinylether copolymer, tetrafluoroethylene-hexa-fluoropropylen copolymer, polychlorotrifluoroethylene, tetrafluoroethylene-ethylene copolymer, chlorotrifuluoroethylene-ethylene copolymer, polyvinylidene fluoride, polyvinyl fluoride and the like. The fluoroplastic film 21 has a high heat resistance, a high resistance to chemicals and a high weather (light) proof. The fluoroplastic film 21 also has physical properties necessary for a decorative surface of an external molding for a vehicle, such as an automobile and protects the metal layer 22 which will be discussed below.

The metal layer 22 can be made for example by applying a metal selected in accordance with a desired metallic color thereto, for example, by vacuum-deposition (evaporation), sputtering, or ion-plating or the like. For example, in case of a color of stainless steel, chrome, titanium, or nickel-titanium alloy can be advantageously used, since they exhibit a color similar to the stainless steel color.

Figure 4:
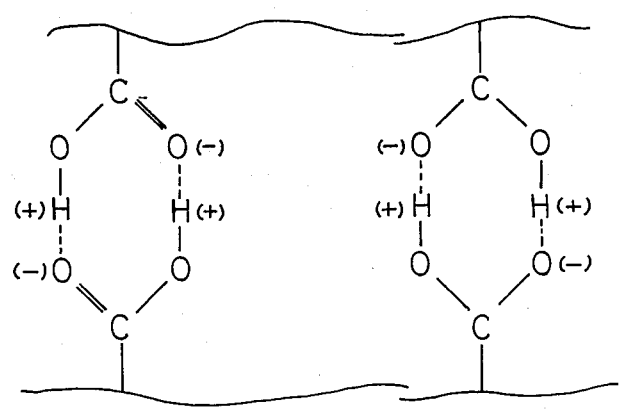

The layer 23 of ethylene-acrylic acid copolymers which protects the metal layer 22 from below is adhered to the backing layer 25 by the adhesive layer 24. Since ethylene-acrylic acid copolymers contain a carboxyl group in a molecular structure thereof and also said carboxyl group is not being ionically neutralized with a metal ion, unlike ion cross-linking co-polymer, the ethylene-acrylic acid copolymers exhibit very excellent adhesion properties to the metal. Furthermore, since the molecular structure of said copolymers contains a carboxyl group as a side chain or the like of the polymer, and since said carboxyl group constitutes a hydrogen bond, as shown in FIG. 4, said ethylene-acrylic acid copolymers have an excellent hot-tack property due to high viscosity at melting and therefore there is an advantage that they are firmly heat-bonded to the metal surface and the like.

Furthermore, as mentioned before, the ethylene-acrylic acid copoymers have no substantial moisture(water)-absorption property, less than half that of ion cross-linking copolymer, and accordingly the layer of ethylene-acrylic acid copolymers 23 serves as a water-proof layer for the metal layer 22.

As the ethylene-acrylic acid copolymers can be advantageously used copolymers comprising of ethylene and ethylenically unsaturated carboxylic acid, such as acrylic acid or methacrylic acid. As ethylenically unsaturated carboxylic acid can be used itaconic acid, fumaric acid and maleic acid, etc. other than the above-mentioned acrylic acid and methacrylic acid which are most preferable. The copolymeric component may contain esters containing lower carbon atoms of aliphatic alkyl (1-6 of carbon number) as one component, such as alkyl acrylate, alkyl methacrylate, dialkyl maleate, dialkyl fumarate or the like.

If necessary, the ionomer plastic layer 26 can be provided under the layer of ethylene-acrylic acid copolymers 23, as shown in FIG. 3. The ionomer plastic layer 26 is useful particularly when the adhesive 24 can not directly connect the layer of ethylene-acrylic acid copolymers 23 and the backing layer 25 because of different solubility paramater (SP value) therebetween etc.

The adhesive layer 24 is adapted to connect the layer of ethylene-acrylic acid copolymers 23 to the backing layer 25 through or without through the ionomer plastic layer 26. The adhesive can be properly selected depending on the material of the backing layer. Namely, in case of the backing resin layer 25 made from plastics containing high polar groups, such as polyvinyl chloride or the like, since it has less affinity for the layer of ethylene-acrylic acid copolymers 23, an isocyanate-containing urethane adhesive or an adhesive which contains vinyl chloride-vinyl acetate copolymer as a main component is preferably used as the adhesive 24. In case where the ionomer plastic layer 26 is laminated on the layer of ethylene-acrylic acid copolymers 23, an adhesive which contains ethylene-vinyl acetate copolymer can be used in addition to the above-mentioned adhesives.

Since the backing layer 25 is adapted to reinforce the decorative sheet or film 20 and is molten to be connected to the substrate 13 which forms the molding 10, the backing layer 25 is made from a material having a compatibility with the substrate 13. For instance, when the substrate 13 is made from polyvinyl chloride, the backing layer 25 is made from polyvinyl chloride or a copolymer thereof with vinyl acetate or other monomers.

The decorative film or sheet 20 which is composed of the fluoroplastic film 21, the metal layer 22, the ethylene-acrylic acid copolymer layer 23, the ionomer plastic layer 26 if necessary, the adhesive layer 24, and the backing layer 25 is molten to be connected at the backing layer 25 to the surface of the substrate 13 so as to exhibit the desired metallic color.

It should be appreciated that a polyester film, an aluminum foil, an iron foil, a stainless steel foil or plate or the like can be provided in or on the substrate 13 to increase the rigidity or maintain a desired cross sectional shape, of the decorative sheet or film 20.

As can be understood from the foregoing, since the decorative film or sheet 20 according to the present invention, which is composed of the fluoroplastic film 21, the metal layer 22, the ethylene-acrylic acid copolymers layer 23, the ionomer layer 26 if necessary, the adhesive layer 24, and the backing layer 25 is molten to be connected to the surface of the substrate 13, even if the decorative sheet or film 20 is deformed or bent to have a large curvature, or even if it is directly exposed to the sunlight, no problem of the stripping of the metal layer from the associated layer is substantially raised and accordingly the service life thereof can be increased.

What is claimed is:

1. A plastic molding, comprising: a plastic substrate and a decorative film or sheet having an outermost protecting layer of fluoroplastics being metallized on one surface, an intermediate layer of an ethylene-acrylic acid copolymer laminated on the metal layer, and an innermost backing layer adhered to the intermediate layer by an adhesive layer, said backing layer of said decorative film or sheet being molten to be adhered onto the plastic substrate, so that the backing layer comes into contact with the plastic substrate.

2. A plastic molding according to claim 1, further comprising another intermediate layer of ionomer plastics between the intermediate layer of ethylene-acrylic acid copolymers and the backing layer, so that the latter is adhered onto the ionomer intermediate layer by the adhesive layer.

3. A plastic molding according to claim 1, wherein said outermost fluoroplastic layer 21 is made of a transparent film of a material selected from polytetrafluoroethylene, tetrafluoroethylene-perfluoroalkylvinylether copolymer, tetrafluoroethylene-hexa-fluoropropylene copolymer, polychlorotrifluoroethylene, tetrafluoroethylene-ethylene copolymer, chlorotrifluoroethylene-ethylene copolymer, polyvinylidene fluoride, and polyvinyl fluoride.

4. A plastic molding according to claim 1, wherein said ethylene-acrylic acid copolymers are made from copolymers of ethylene and ethylenically unsaturated carboxylic acid.

5. A plastic molding according to claim 4, wherein said ethylenically unsaturated carboxylic acid is acrylic acid.

6. A plastic molding according to claim 4, wherein said ethylenically unsaturated carboxylic acid is methacrylic acid.

* * * * *